Figure 16:
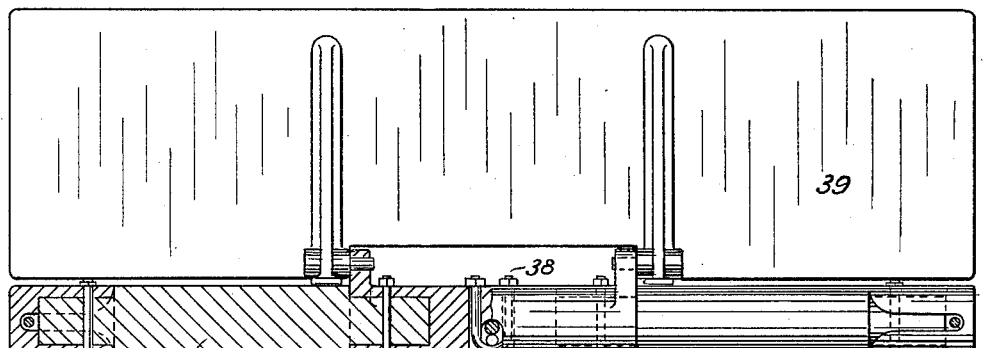

N. R. SMITH.
CURRENT POWER TRANSMUTER.
APPLICATION FILED DEC. 27, 1909.
1,030,835.
Patented June 25, 1912.
8 SHEETS—SHEET 1.
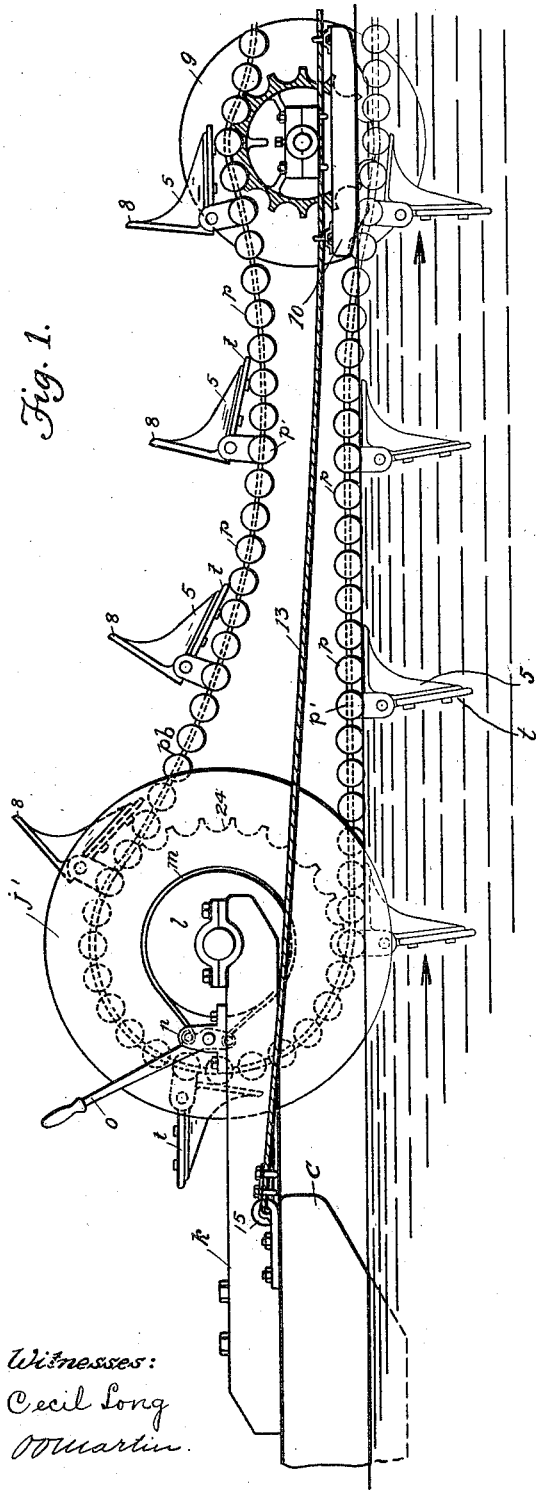
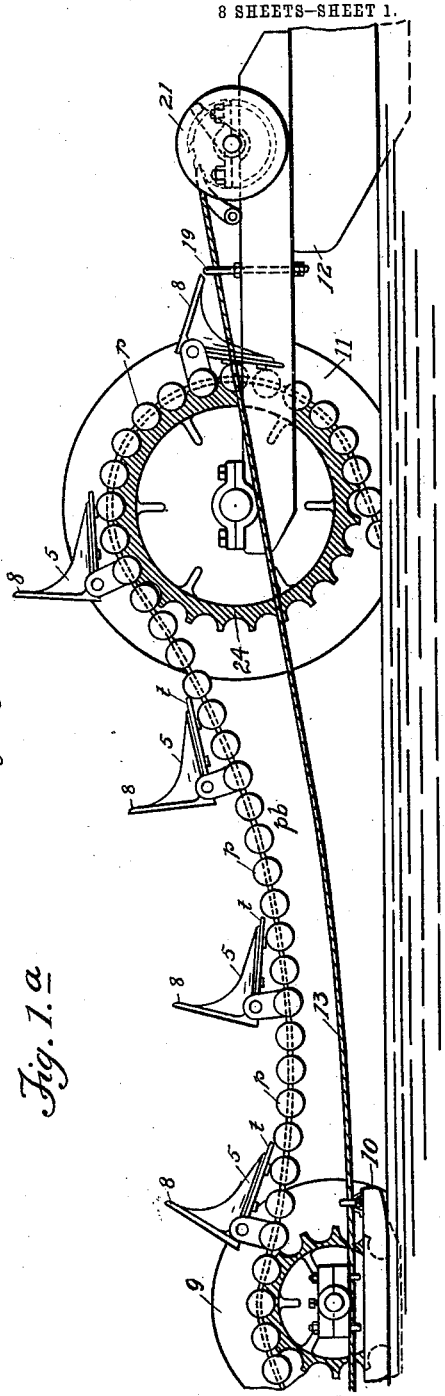
Witnesses:
Cecil Long
O. O. Martin.
Inventor:
Norman R. Smith
by T. J. Geisler
Atty.

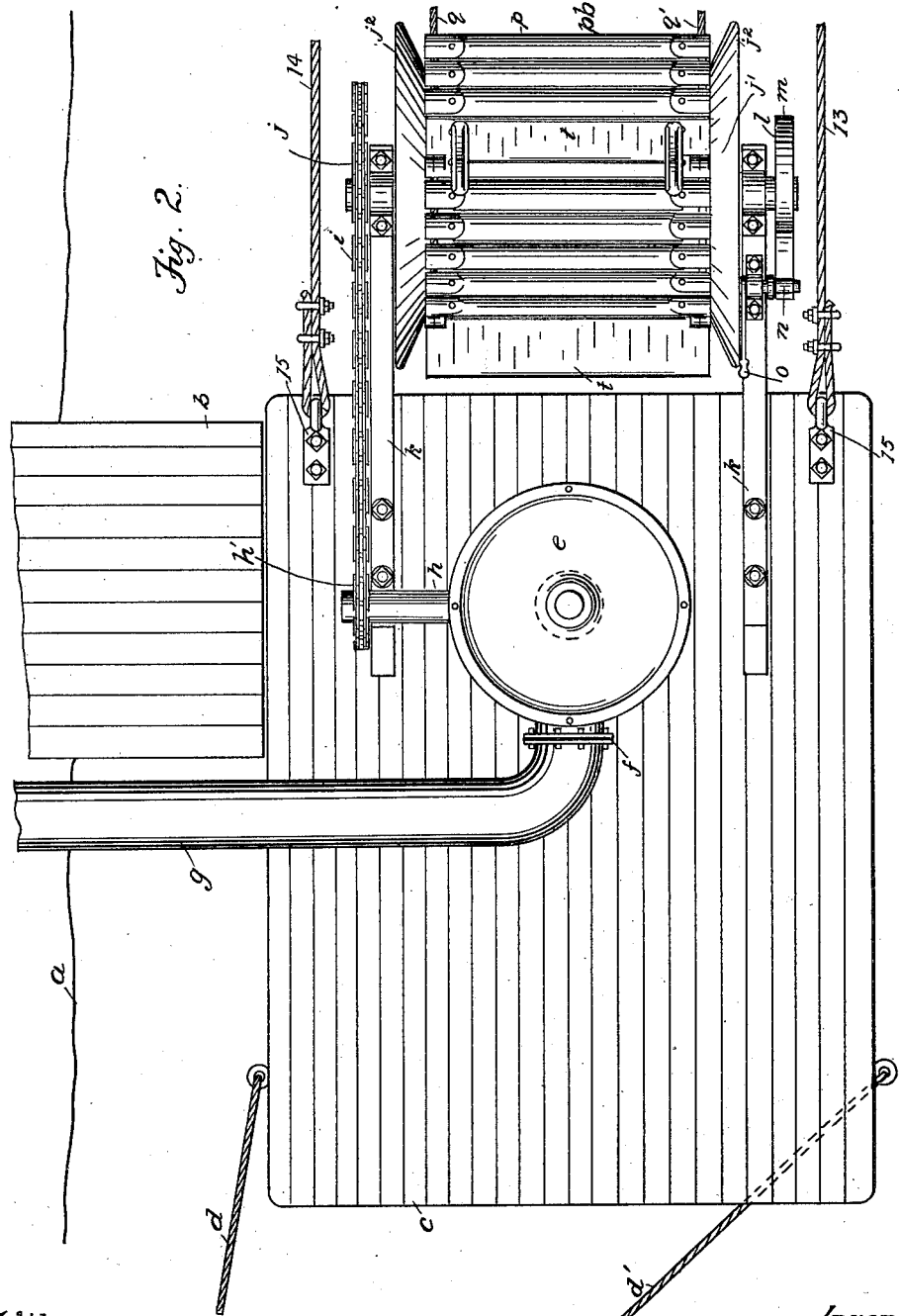

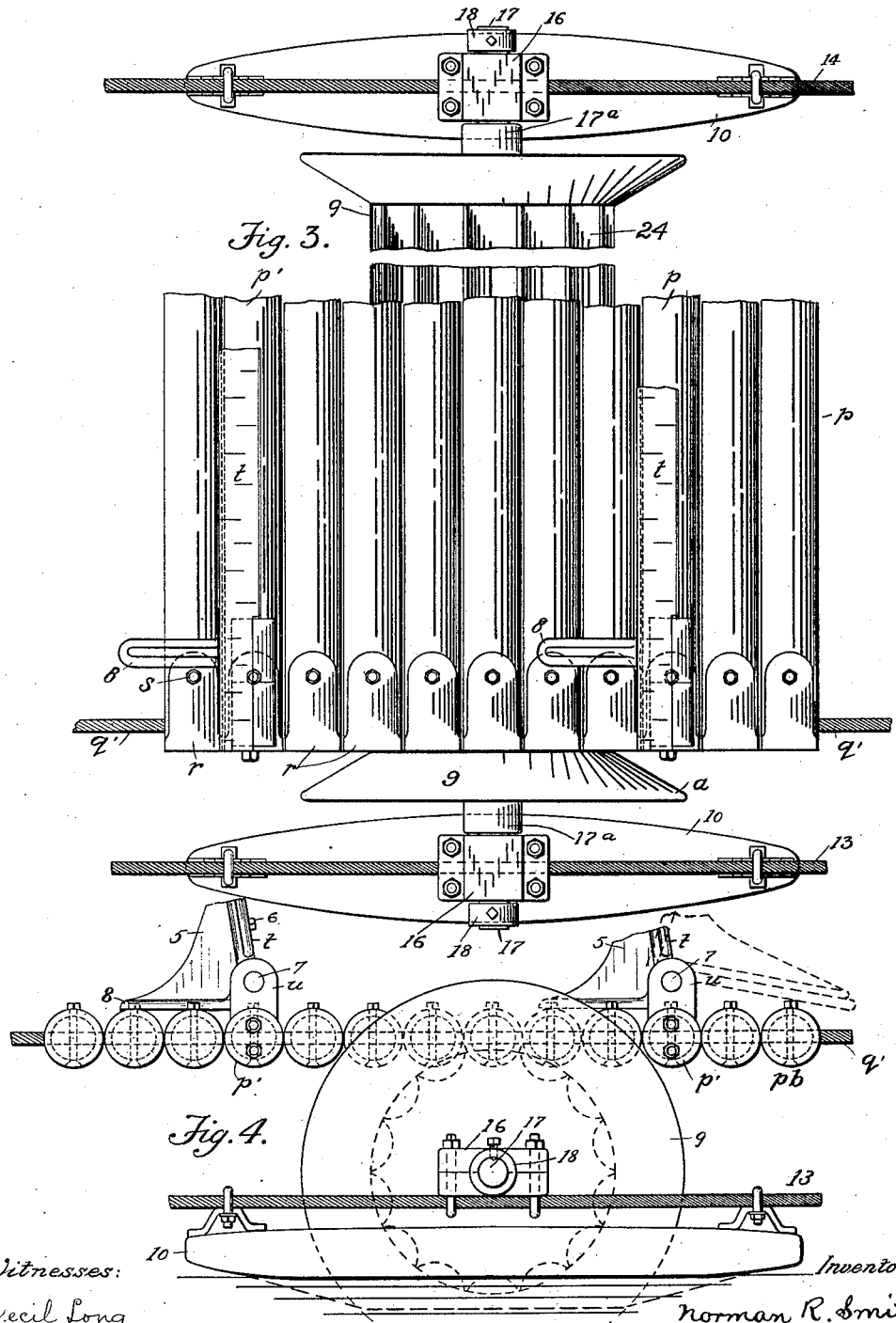

N. R. SMITH.
CURRENT POWER TRANSMUTER.
APPLICATION FILED DEC. 27, 1909.
1,030,835.
Patented June 25, 1912.
8 SHEETS—SHEET 4.
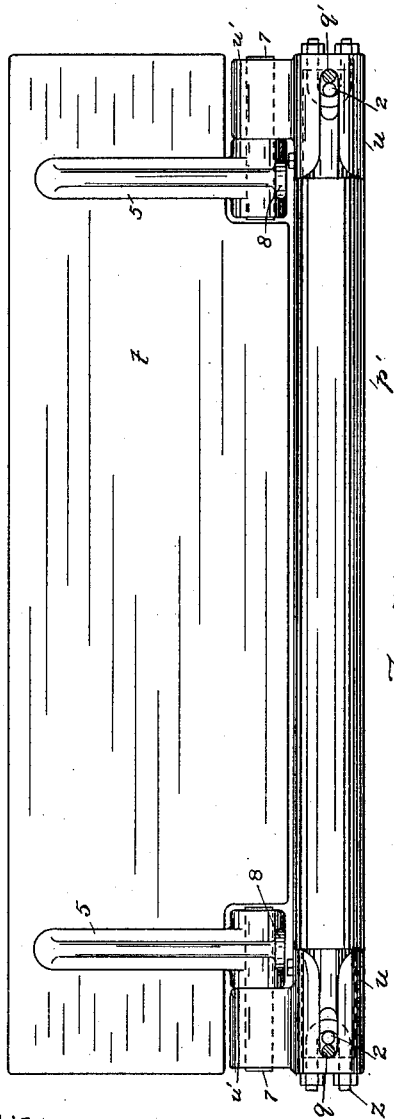
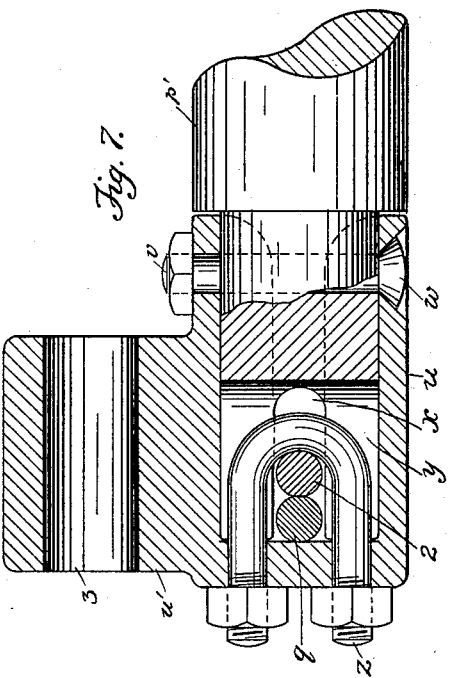
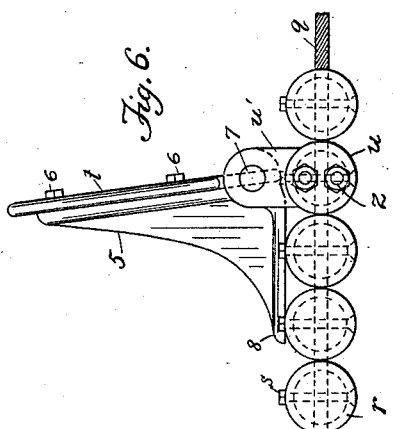
Witnesses:
Cecil Long
O. Martin
Inventor:
Norman R. Smith
by T. H. Geisler
Atty.

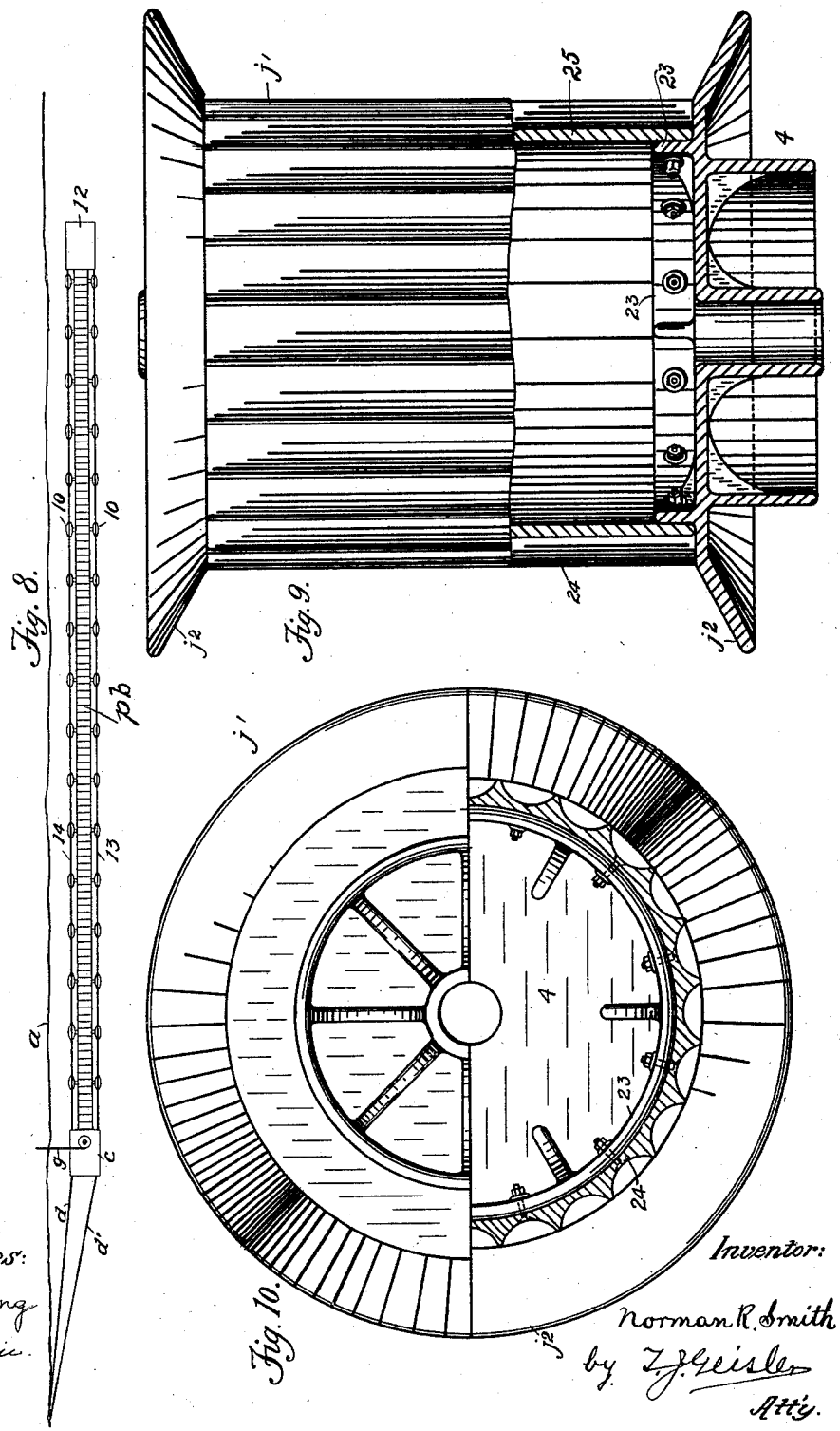

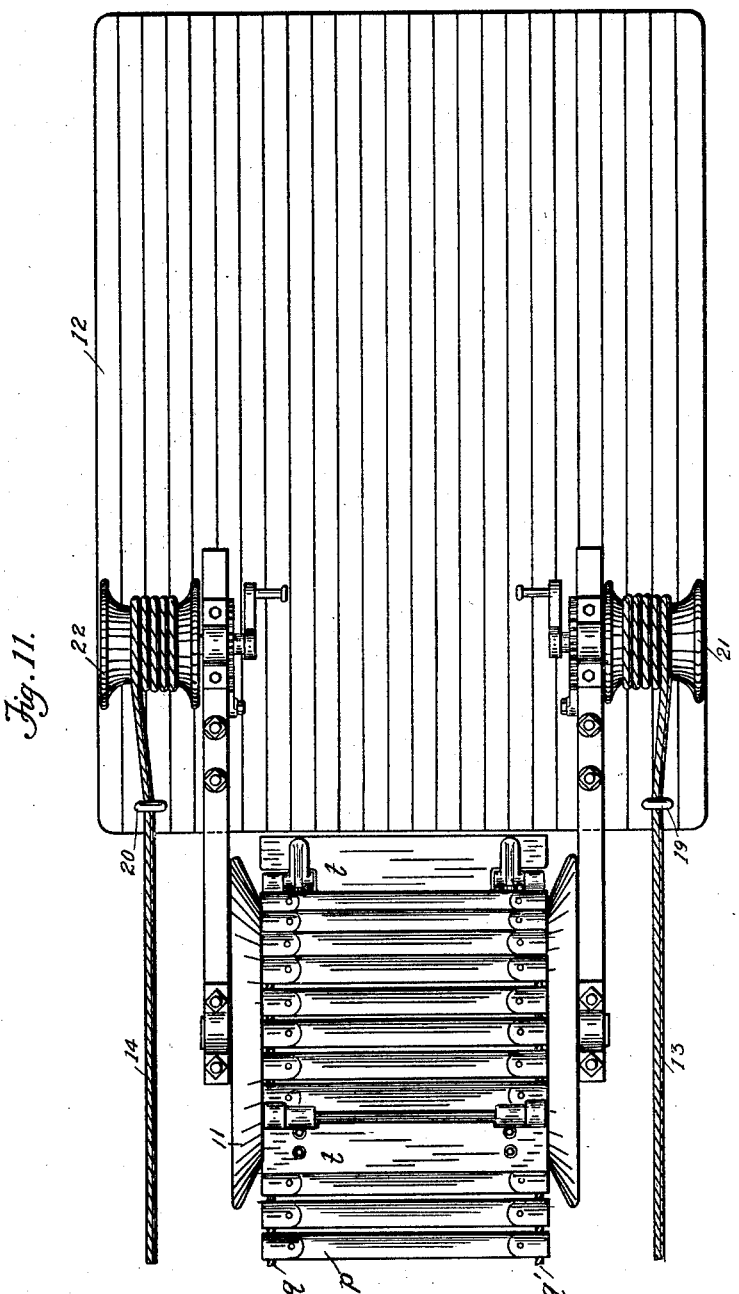

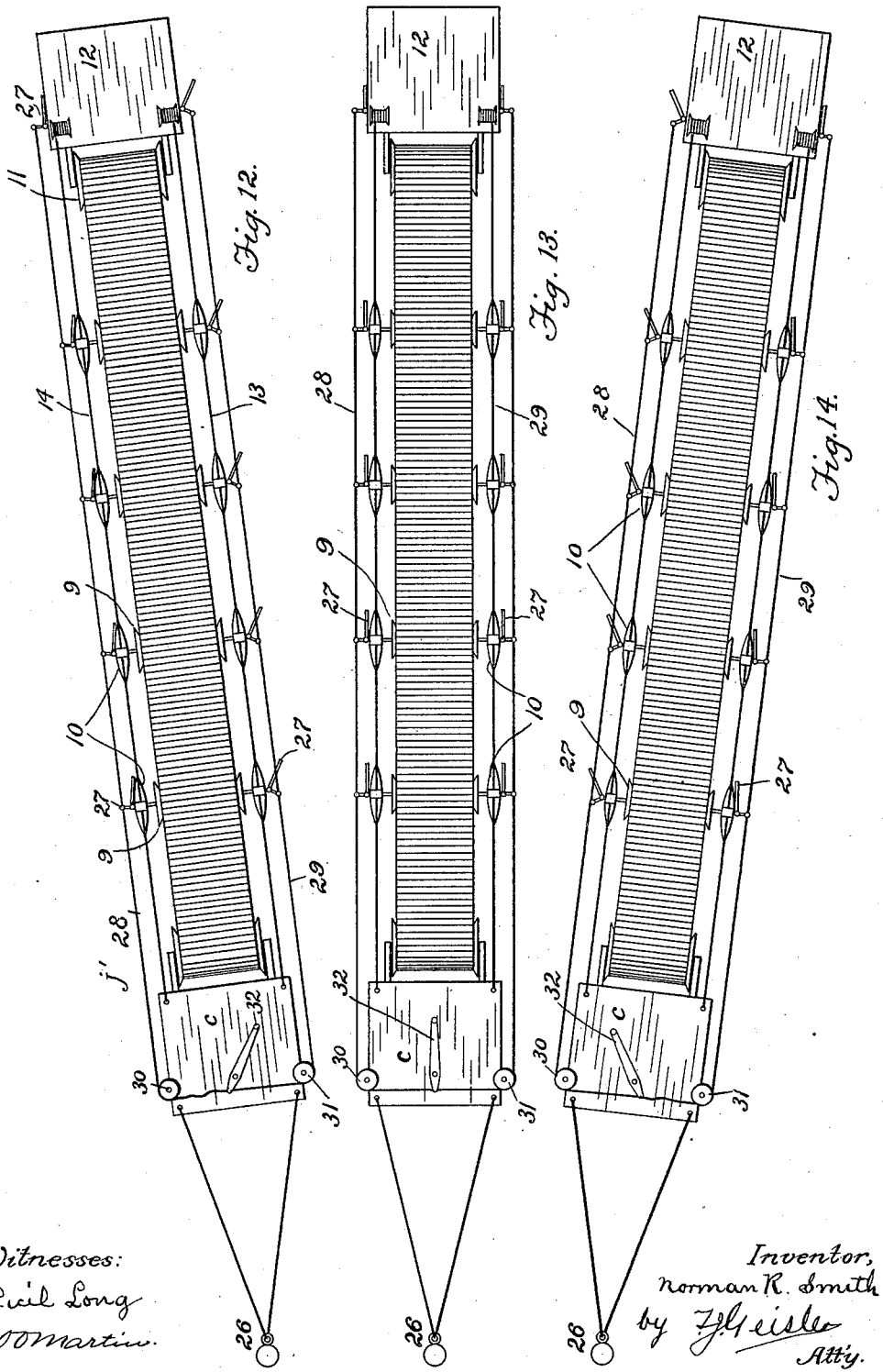

N. R. SMITH.
CURRENT POWER TRANSMUTER.
APPLICATION FILED DEC. 27, 1909.

1,030,835.

Patented June 25, 1912.
8 SHEETS—SHEET 8.

Witnesses:
Cecil Long
O Martin

Inventor,
Norman R. Smith
by T. J. Geisler
Atty.

UNITED STATES PATENT OFFICE.

NORMAN R. SMITH, OF PASCO, WASHINGTON, ASSIGNOR TO HYDRO PATENT POWER CO., OF PORTLAND, OREGON, A CORPORATION OF OREGON.

CURRENT-POWER TRANSMUTER.

1,030,835.  Specification of Letters Patent.  Patented June 25, 1912.

Application filed December 27, 1909. Serial No. 535,179.

*To all whom it may concern:*

Be it known that I, NORMAN R. SMITH, a citizen of the United States, and a resident of Pasco, Franklin county, State of Washington, have invented a new and useful Improvement in Current-Power Transmuters, of which the following is a specification, reference being had to the accompanying drawings, constituting a part thereof.

My invention has for its object to provide a current-power transmuting device, that is, a device which transforms the power obtainable from the flowing current of a stream and utilize it for practical purposes; and my device embodies the following features: A support for each of the extremities of an endless traveling power-belt, one of such supports fixed in position, and may consist of a moored float, or a platform, on the shore adapted to movement on a vertical axis, as convenient; the other support is a float adrift in the current. On the supports are mounted rotatable drums over which travels the power-belt, the latter being driven by the impact of the current of the stream against a series of blades pendent from the power-belt, and the support, which is adrift, is held in down-stream position by the current. The length of the power-belt, and incidentally the number of impact blades thereon, is adapted to the power to be developed. The blades of the power-belt are preferably so arranged and adapted that when on their return travel, and thus out of the water, they will expose only a minimum area to the wind. The span of the power-belt is supported on rotating drums mounted on pontoons located intermediate the supports of the ends of the power-belt; the supports and the pontoons being connected, preferably by adjustable means, in series. The periphery of the drums, and the related surface of the power-belt, are adapted to engage each other when in contact. The return section of the power-belt lies on the upper part of the periphery of the intermediate drums, and the outgoing, driven section of the power-belt is held by the impact of the current against the blades, and the adaptation of the latter to that purpose, against the under portion of the periphery of the intermediate drums, so as to cause the latter to be positively rotated, in the passage of the power-belt, and by such rotation to apply a driving force in the return direction to the return section of the power-belt, thereby relieving my device of having to drag back a long span of the power-belt, and facilitating the work of the power-belt as a whole. To relieve the strain, due to the weight of the return section of the power-belt, the latter is preferably adapted to float on the surface of the water. Means are provided for preventing any undue strain or friction of the power-belt on the drums supporting its extremities; and means are provided for shifting the position of the down-stream floating support, and thus the down-stream end of my device, so as to swing the latter to any convenient angle relative to the current, or to swing it temporarily out of the way, to allow sea-way to a passing vessel. These features and other details of my current motor, as well as its principle of operation, are more readily understood from the accompanying drawings, and the description thereof hereinafter set forth.

Figure 15:
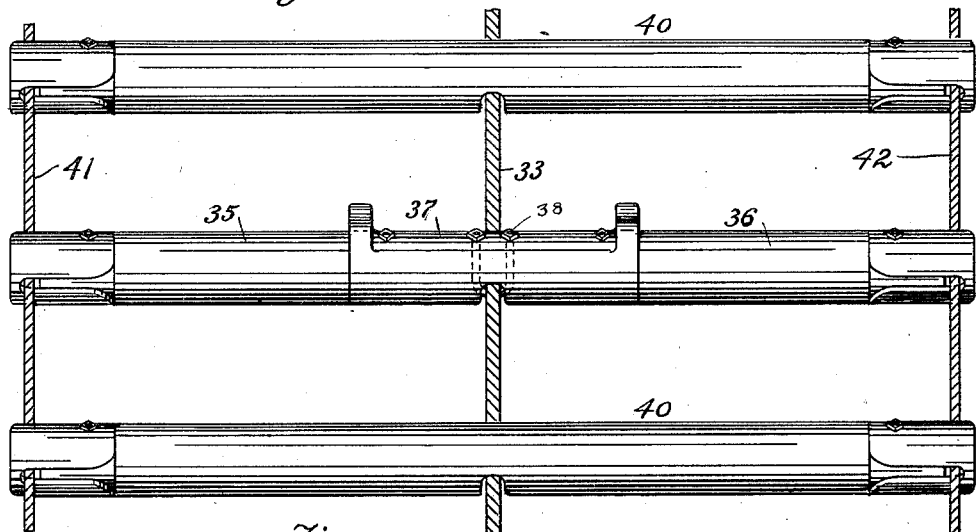

In the drawings: Figures 1 and 1ª, taken together, show a side elevation of the opposite extremity of my device, and illustrates its general arrangement; Fig. 2 is a top view of the anchored or fixed float supporting the drum around which runs one extremity of the power-belt of my device; this float being represented as placed adjacent to a wharf, and this view also illustrating means for utilizing the power developed by my device in the form of a pump, as convenient for irrigating purposes; Fig. 3 is a top view of one of the intermediate drums with pontoons on which the same are supported, and means for connecting the same to the floats supporting the extremities of the power-belt, the intermediate drums supporting the span of the power-belt, and being adapted to facilitate travel thereof, that the coöperating devices, by the driven section of the power-belt, will rotate the intermediate drums, and the latter will in turn exert a driving force upon the return end of the power-belt; Fig. 4 is an end elevation of parts shown in Fig. 3; Fig. 5 is a detail illustrating the mode of hingedly attaching impact blades to the power-belt; Fig. 6 is an end elevation illustrating the same construction; Fig. 7 is a detail, on larger scale, of means provided for alining the draft members, component parts of my power belt, on which the impact blades are hinged; Fig. 8 is a diagrammatic plan of my device anchored in proximity to one shore of the stream, as in practice; Figs. 9 and 10 represent, respectively, a sectional top view and a sectional end elevation of the drums mounted on the floats supporting the opposite extremity of the power-belt; Fig. 11 is a top view of the down-stream float supporting the down-stream loose end of the power-belt, and this view also illustrates the provision of drums on which are wound the down-stream ends of cables connecting the floats of my device, the purpose of which arrangement will be clearly set forth in the body of the specification; Figs. 12, 13 and 14 are diagrammatic illustrations of my current-power transmuter and of rudder-like means therewith combined by which the current motor is caused to assume any position relative to the current of the stream or the shore line; Fig. 15 shows a portion of the endless power-belt of my device adapted to comprise only a single, central hauling cable; and Fig. 16 is a detail of one of the spacers of the single hauling cable, $p, b$, to which a blade is hinged.

In the outset of my description it will be well to state that I have discovered that a current-power transmuter, or motor, of the character referred to, will give greater efficiency, if the support of its up-stream end alone be fixed in position, by means permitting movement on a vertical axis, and the support for the other extremity be free to drift with, and adapt itself to, the course of the current. One reason for this, apparently, is that the drifting end of such device can accommodate itself to the flow of the current, and is more effectively acted upon by the latter; it also permits unlimited length in the power-belt, and, of course, the longer the latter the greater the power developed and transmitted. Furthermore, by reason of being able to adjust the position of the drifting end of my device at any convenient angle, I can favor the same and promote its efficiency, by causing such drifting end to become positioned at such oblique angle to the current that the foremost impact blades will be more or less exposed to the force of the current, and will not be entirely covered by the rearward impact blades.

Referring in the first instance to Fig. 2, which shows the up-stream float of my device and which is moored in place: $a$ represents the shore line, from which extends a wharf $b$, and the float $c$ being moored close to the wharf by cables $d, d'$, the opposite ends of which are fastened at some convenient point up-stream. On the float $c$ is mounted a pump $e$, the inlet of which (not shown), it will be assumed, is located in the bottom of the float, and the pump is provided with an outlet at $f$. To the latter is clamped a pipe $g$, which is extended from the float to any convenient point on the shore, the extension being accomplished by any convenient means adapting the pipe to accommodate any movement of the float by swells or tide.

On the end of the pump-shaft $h$ is mounted a sprocket wheel $h'$, on which runs one end of a sprocket-chain $i$, which provides the connection between the pump and the driven sprocket-wheel $j$ on the drum $j'$. The drum $j'$ is operatively supported on the float by arms $k$. The drum $j'$ comprises lateral flanges $j^2$ adapted to hold the endless power-belt, $p, b$, in place. On one end of the drum-shaft is mounted a brake-wheel $l$, encompassed by a brake-band $m$, thrown on and off by a lever $o$, affixed to a shaft $n$, and thus provide the means for controlling the rotation of the drum $j'$. Over the drum $j'$ runs one end of the power-belt, $p, b$, and the opposite end of the latter is supported on the drum mounted on the float 12, shown in Fig. 11, and which are again referred to.

The power-belt, $p, b$, is conveniently made of a series of cylindrical draft-bars $p$, made of wood, so as to be buoyant, and said draft bars are connected at their ends by cables $q, q'$, which also represent the lower transmuting cables.

To adapt the power-belt, $p, b$, to be driven by the current, it is provided with hinged impact blades $t$, set at predetermined distances apart, and the impact blades are rendered feathery, that is to say, the impact blades on the return section of the power-belt being adapted to expose only a minimum area against the wind coming from an up-stream direction, so as to prevent such wind exerting any retarding action upon my power transmuter to any interfering degree. These details will be again referred to.

To cause the cylindrical draft-bars of the power-belt to have operative contact with the drums over which the power-belt runs, and which are rotated by it, the periphery of each of the drums is made with longitudinal, parallel flutes or grooves 24, for the draft-bars to lie in. This feature will be readily understood by inspecting and comparing, for example, Figs. 1, 1ª, 3 and 4.

When my device comprises two cables, like $q, q'$ (both, as already mentioned, being draft cables) it is required that both cables travel at the same speed, in order that my device may properly operate, and it is further required that the draft bars $p$ be as nearly parallel to each other as possible, so that in the course of travel of the power-belt the draft-bars will remain in proper relation to the longitudinal grooves 24 of the drums. To accomplish this adjustment, the draft-bars $p'$, to which the impact blades are hinged, have mounted on their ends metal caps $u$, clamped in place by means of a perpendicular bolt $v$, the head $w$ of which is countersunk, so as to adapt the roller ends to lie in the grooves 24 of the drums. The ends of the draft-bars $p'$ are further provided with grooves $x$, $y$ (see Fig. 7). Through the groove $x$ extend the cables $q$, $q'$, and the ends of the draft-bars $p'$ are clamped to the cables $q$, $q'$, by U-shaped clamping bolts $z$, provided in said caps $u$, and short spacing pieces 2 are inserted to prevent the clamping strain injuring the cables $q$, $q'$.

When constructing the power-belt of my device, the shaft-bars $p$, $p'$ are first arranged on the cables $q$, $q'$, as nearly parallel as possible, then the power-belt is permitted to travel with the current of the stream, and in the course of such travel the draft-bars, passing over the drums $j'$ on the float $c$, are set up close to each other, so as to become properly related to each other and the peripheral grooves of the drum $j'$. When so adjusted the draft-bars will have been arranged as shown in the drawings, and thus without any interfering slack between them. This adjustment of the draft-bars must be maintained throughout the working of my current-power transmuter. The ends of the cables $q$, $q'$ are united so as to render them continuous in any convenient way.

It will be noted that by the described adjustment of the draft-bars they will also be so positioned as to travel at the same radial distance from the axial center of the drums on the floats of my device.

The caps $u$ are provided with projecting portions $u'$ having a longitudinal bore 3, so as to be adapted to constitute bearings for the trunnions 7 of the brackets 5, to which the blades $t$ are bolted by means of bolts 6. The brackets 5 are provided with angular projecting portions 8, adapted to bear upon adjacent draft bars, and in so doing to hold the impact blades $t$ at the desired angle, as illustrated in Fig. 1.

The purpose of the angular position, to be noted from Fig. 1, at which the impact blades $t$ are held, by reason of the construction described, is to cause the impinging force of the current to aid in holding the driven section of the power-belt on the surface of the water, and, incidentally, to hold the draft bars of the power-belt of the driven section of the latter in operative contact with the fluted periphery of the intermediate drums 9, thereby rotating the latter and causing them to exert a pulling force on the return section of the power-belt, thereby eliminating, more or less, the carrying of the dead weight of the span of the return section of the power-belt, and also facilitating the return travel of the latter.

The intermediate drums 9 are located at uniform distances apart between the floats supporting the extremity of the power-belt. Said intermediate drums are mounted on pontoons 10, see Fig. 3. The pontoons 10 are fastened to cables 13, 14, the ends of which are fastened to the floats $c$ and 12.

The bearings or boxes 16, for the journal ends 17 of the intermediate drums 9, may be secured to the cables 13, 14, if convenient. On the extremities of the journal ends 17 are affixed set collars 18 and shoulders 17[a] are provided to properly journal the intermediate drums.

The up-stream ends of the cables 13, 14 are fastened to the float $c$ by straps 15. The down-stream ends of the cables 13, 14 extend through guides 19, 20 and wind on drums 21, 22, mounted on the down-stream float 12. By the cables 13, 14 the floats and the intermediate pontoons are maintained in working alinement, and said cables, in combination with the drums 21, 22, also provide the means by which the power-belt is kept in proper tension, since it regulates the distance between the drums $j'$ and 11 supporting the opposite ends of the power-belt. Furthermore, by winding up the cables 13, 14 on the drums 21, 22, the float 12 may be hauled close to the float $c$ and in so doing the power-belt loaded on the former, when it is required to move my device from one location to another. When hauling the power-belt on the float 12, the pontoons are disconnected from the cables 13, 14. The drum 11, holding the down-stream end of the power-belt, is, as evident, a duplicate of the drum $j'$ holding the up-stream end, except it has no brake for controlling the rotation of the drum.

The particular mechanical construction of my device is not important to my invention. Convenient modes of construction are illustrated in Figs. 9 and 10, which show each drum as comprising two heads or ends 4, provided with flanges 23, on which is bolted a cylindrical shell 25, provided on its exterior face with longitudinal grooves 24.

In Figs. 12, 13 and 14 the up-stream end of my device is represented as moored to a fixed point 26. The pontoons 10 of the intermediate drums 9 and the down-stream float 12 are severally provided with rudder-blades 27, connected by cables 28, 29, passing over pulleys 30, 31, and operated by a lever 32, on the float $c$, and by the adjustment of the rudder-blades the down-stream end of my current-power transmuter can be swung out into the stream, or onto the shore as convenient, or to allow sea-way to a passing vessel. Under ordinary conditions, however, the tail or down-stream end of my device is allowed to become positioned as it may be by the flow of the current.

In Figs. 15 and 16 I have shown how my device may be modified so as to comprise only a single central draft cable 33. The draft-bars 34, to which the impact blades 39 are hinged, in this instance are composed of divided members 35, 36 united by an intermediate member 37, having a medial groove in which the draft cable 33 is located and secured by a U-bolt 38.

The ends of the draft-bars 34, as well as the intermediate draft-bars 40, are connected by stay cables 41, 42. In other respects the construction of the power-belt is substantially as above described; and, as obvious, the type of power-belt last described and illustrated in Figs. 15 and 16 is adapted to run over the drums just the same as the other type of power-belt.

In place of the rudders any convenient means may be used by which the position of the drifting end of my device can be laterally shifted as required.

The buoyancy of the draft-bars $p$, $p'$ is conveniently used as a help to float the outgoing, driven section of the power-belt; but the draft-bars may, nevertheless, be made of any material, since the impact of the current against the oblique impact blades of the power-belt will hold the driven section of the latter to the surface of the stream. When the device is in operation, the power-belt will be so taut that one can walk over it.

I claim:

1. A current-power transmuting device comprising a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; means providing a working engagement between the periphery of the driven drum and the related face of the power-belt when in contact; and means for laterally shifting the position of the floating support.

2. A current-power transmuting device comprising a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; means providing a working engagement between the periphery of the driven drum and the related face of the power-belt when in contact; said impact blades being adapted, when subjected to the force of the current, to assume an oblique position so as to cause the current to impel the power-belt against the periphery of the intermediate drums and thus support and drive the latter; and means for laterally shifting the position of the floating support.

3. A current-power transmuting device comprising a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; means providing a working engagement between the periphery of the driven drum and the related face of the power-belt when in contact; said impact blades being adapted, when subjected to the force of the current, to assume an oblique position so as to cause the current to impel the power-belt against the periphery of the intermediate drums and thus support and drive the latter; rudders on the drifting float and the intermediate pontoons, and means adapted to operate all the rudders in unison.

4. A current-power transmuting device comprising a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; cables connecting the floating support to the fixed support, and to which the pontoons are detachably secured in series, and means on one of said supports adapted to wind up the cables and thus draw the supports together; an endless power-belt traveling over the drums and provided with a series of impact blades; means providing a working engagement between the periphery of the driven drum and the related face of the power-belt when in contact; said impact blades being adapted, when subjected to the force of the current, to assume an oblique position so as to cause the current to impel the power-belt against the periphery of the intermediate drums and thus support and drive the latter; rudders on the drifting float and the intermediate pontoons, and means adapted to operate all the rudders in unison.

5. A current-power transmuting device comprising a support fixed in place by means permitting its movement on a vertical axis, and a power-transmitting element including a rotatable drum mounted on such support; a brake element by which to control the revolution of the drum; a companion, floating support, and a drum rotatably mounted thereon, said floating support being adrift and held down stream by the current; pontoons located between said supports and rotatable drums thereon mounted; connections between said supports, to which connections the pontoons are also attached; an endless power belt traveling over the drums and provided with a series of impact blades; means providing a working engagement between the periphery of the driven drum and the related face of the power-belt when in contact; said impact blades being adapted, when subjected to the force of the current, to assume an oblique position so as to cause the current to impel the power-belt against the periphery of the intermediate drums and thus support and drive the latter; and means for laterally shifting the position of the floating support.

6. In a current-power transmuting device, a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades, the latter so arranged that while the power-belt is traveling in the return direction they will expose only a minimum surface to the wind; means providing a working engagement between the periphery of the driven drum and the related face of the power-belt when in contact; and means for laterally shifting the position of the floating support.

7. In a current transmuting device, a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; the periphery of the driven drums being fluted longitudinally, and said power-belt comprising parallel cables; a continuous series of transverse draft-bars adjustably attached to said cables and adapted to become seated in said peripheral flutes; and means for laterally shifting the position of the floating support.

8. In a current-power transmuting device, a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; the periphery of the driven drums being fluted longitudinally, and said power-belt comprising parallel cables; a continuous series of transverse, buoyant draft-bars adjustably attached to said cables and adapted to become seated in said peripheral flutes; and means for laterally shifting the position of the floating support.

9. In a current-power transmuting device, a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; the periphery of the driven drums being fluted longitudinally, and said power-belt comprising parallel cables; a continuous series of transverse, buoyant draft-bars adjustably attached to said cables and adapted to become seated in said peripheral flutes; said impact blades being adapted, when subjected to the force of the current, to assume an oblique position so as to cause the current to impel the power-belt against the periphery of the intermediate drums and thus support and drive the latter; and means for laterally shifting the position of the floating support.

10. In a current-power transmuting device, a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; cables connecting the floating support to the fixed support, and to which the pontoons are detachably secured in series, and means on one of said supports adapted to wind up the cables and thus draw the supports together; an endless power-belt traveling over the drums and provided with a series of impact blades; means providing a working engagement between the periphery of the driven drum and the related face of the power-belt when in contact; and means for laterally shifting the position of the floating support.

11. In a current-power transmuting device, a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; the periphery of the driven drums being fluted longitudinally, and said power-belt comprising parallel cables; and a continuous series of transverse draft-bars adjustably attached to said cables and adapted to become seated in said peripheral flutes.

12. In a current-power transmuting device, a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; the periphery of the driven drums being fluted longitudinally, and said power-belt comprising parallel cables; and a continuous series of transverse, buoyant draft-bars adjustably attached to said cables and adapted to become seated in said peripheral flutes.

13. In a current-power transmuting device, a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; means providing a working engagement between the periphery of the driven drum and the related face of the power-belt when in contact; and said impact blades being adapted, when subjected to the force of the current, to assume an oblique position so as to cause the current to impel the power-belt against the periphery of the intermediate drums and thus support and drive the latter.

14. In a current-power transmuting device, a support fixed in place by means permitting its movement in a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; the periphery of the driven drums being fluted longitudinally, and said power-belt comprising parallel cables; a continuous series of transverse draft-bars adjustably attached to said cables and adapted to become seated in said peripheral flutes; and said impact blades being adapted, when subjected to the force of the current, to assume an oblique position so as to cause the current to impel the power-belt against the periphery of the intermediate drums and thus support and drive the latter.

15. In a current-power transmuting device, a support fixed in place by means permitting its movement on a vertical axis, and a power-transmitting element including a rotatable drum mounted on such support; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; the periphery of the driven drums being fluted longitudinally, and said power-belt comprising parallel cables; a continuous series of transverse, buoyant draft-bars adjustably attached to said cables and adapted to become seated in said peripheral flutes; and said impact blades being adapted, when subjected to the force of the current, to assume an oblique position so as to cause the current to impel the power-belt against the periphery of the intermediate drums and thus support and drive the latter.

16. In a current-power transmuting device, a support fixed in place by means permitting its movement on a vertical axis, and a power-transmitting element including a rotatable drum mounted on such support; a brake element by which to control the revolution of the drum; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; and means providing a working engagement between the periphery of the driven drum and the related face of the power-belt when in contact.

17. A current-power transmuting device comprising a support fixed in place by means permitting its movement on a vertical axis, and a power-transmitting element including a rotatable drum mounted on such support; a brake element by which to control the revolution of the drum; a companion, floating support, and a drum rotatably mounted thereon, said floating support being adrift and held down stream by the current; pontoons located between said supports and rotatable drums thereon mounted; connections between said supports, to which connections the pontoons are also attached; an endless power-belt traveling over the drums and provided with a series of impact blades; means providing a working engagement between the periphery of the driven drum and the related face of the power-belt when in contact; and said impact blades being adapted, when subjected to the force of the current, to assume an oblique position so as to cause the current to impel the power-belt against the periphery of the intermediate drums and thus support and drive the latter.

NORMAN R. SMITH.

Witnesses:
W. A. Cleland,
Cecil Long.

---

Copies of this patent may be obtained for five cents each, by addressing the "Commissioner of Patents, Washington, D. C."